A. D. MEISELBACH.
CYCLE.
APPLICATION FILED MAY 31, 1921.
1,409,748.
Patented Mar. 14, 1922.
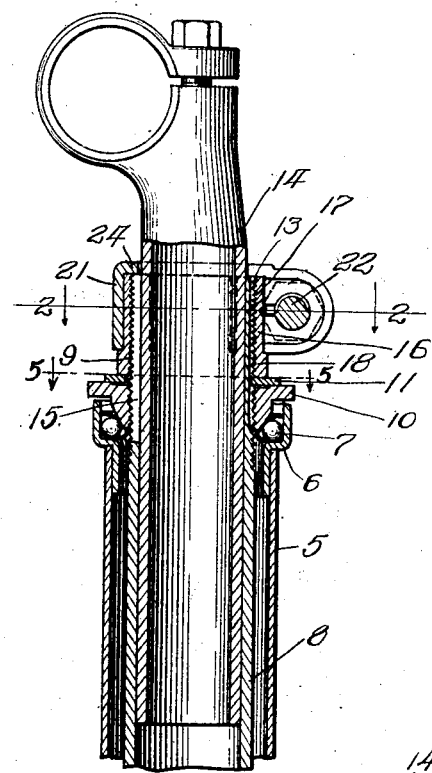
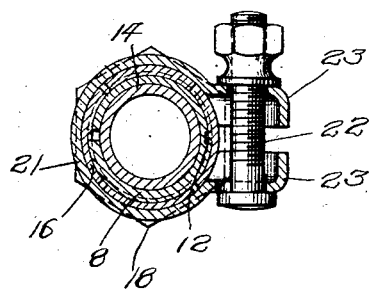
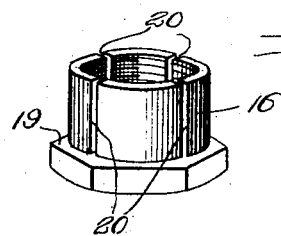
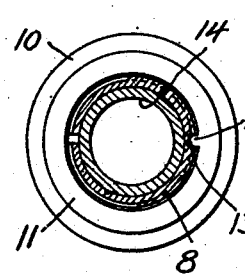
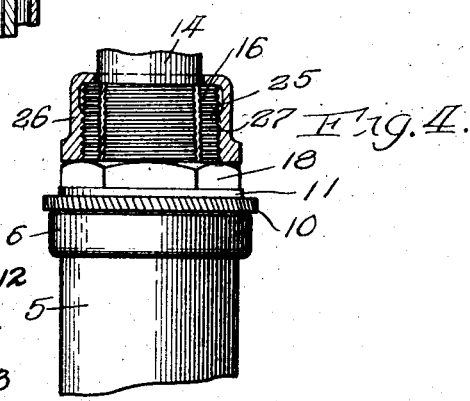
Inventor,
August D. Meiselbach,
By Dyrenforth, Lee, Chritten & Wiles
Attys.

UNITED STATES PATENT OFFICE.

AUGUST D. MEISELBACH, OF CHICAGO, ILLINOIS, ASSIGNOR TO MEAD CYCLE COMPANY, OF CHICAGO, ILLINOIS, A CORPORATION OF ILLINOIS.

CYCLE.

1,409,748.  Specification of Letters Patent.  Patented Mar. 14, 1922.

Application filed May 31, 1921. Serial No. 473,811.

*To all whom it may concern:*

Be it known that I, AUGUST D. MEISELBACH, a citizen of the United States, residing at Chicago, in the county of Cook and State of Illinois, have invented a new and useful Improvement in Cycles, of which the following is a specification.

My invention relates more particularly, to bicycles, and more especially to the head portion thereof at which the front steering wheel of the bicycle is supported.

The invention has more to do with the securing of the handle-bar stem to the fork stem journaled in the head and in the lower end of which the front wheel is journaled.

According to prevailing practice two general types of securing means have been employed, the one involving a clamp member which surrounds the upper end of the fork stem, the latter being formed of steel tubing, and operating to clamp the stem about the handle-bar stem inserted into the upper end of the fork, the stem being slotted to permit of the contraction of the fork stem about the handle-bar stem; and the other involving the slotting of the lower end of the handle bar stem, and the employment therewith, of wedging means operating to expand the lower end of the handle-bar stem into frictional engagement with the inside of the fork stem into which it extends, both of these methods presenting objections. As structures involving the external clamping ring have hitherto been provided, it has been necessary to very materially reduce the thickness of the metal forming the upper end of the fork stem, to provide the smooth unthreaded exterior surface thereof for receiving the clamp, such surface being provided by removing the threads formed on the upper extremity of the fork. The result was the provision of a fork stem the upper end of which did not present sufficient thickness of metal to insure against fracturing of the fork stem adjacent the portion surrounded by the clamp, as for example when subjected to the stresses imposed upon it when the bicycle fell over on its side, its handle bar striking the pavement. The internal expander type of construction above referred to also presents objections in that especially with the present day type of steel tubing involving welded longitudinal joints, the fork stem would oftentimes become fractured at the joint, in the tightening up of the expanding means and thereby impair the structure and furthermore it is difficult to obtain the desired degree of clamping of the handle-bar stem to the fork stem, and this is particularly true in the case of bicycles as now commonly made and involving handle bars which have relatively widespread simulating motorcycle constructions and presenting a high degree of leverage on the steering wheel.

My primary object generally stated is to provide a novel, simple and economical construction of the external clamping type which shall not present the objections of this type of construction as hitherto provided.

Referring to the accompanying drawings, Figure 1 is a view in elevation of the upper portion of the head of a bicycle, and the lower portion of a handle-bar stem assembled with the fork stem in the head, in accordance with my invention the major portion of the structure being shown in section; Figure 2 is a section taken at the line 2, 2 on Fig. 1 and viewed in the direction of the arrows; Figure 3 is a perspective view of a clamping bushing employed. Figure 4 is a view in elevation, partly sectional, of a modification of the structure shown in Fig. 1; and Fig. 5, a section taken at the line 5—5 on Fig. 1 and viewed in the direction of the arrows.

Referring to the structure shown in Figs. 1, 2 and 3, 5 represents the substantially vertically disposed tubular head portion of a bicycle frame in accordance with common practice, its upper end containing a ball-race 6 in which ball-bearings 7 are located. The end of the tubular fork stem is represented at 8, this stem extending upwardly through the tube 5 and having its upper outer surface screw threaded as represented at 9. Screwed upon the threads 9 is a cone 10 between which and the race 6, the balls 7 are confined, and superposed on the cone 10 is a lock-washer 11 which surrounds the upper end of the fork stem 8 and extends at a lug 12 thereon into a groove 13 located in the outer surface of the stem 8 and extending lengthwise thereof.

The handle-bar stem is represented at 14, this stem which is shown as hollow, extending at its lower end into the upper end of the fork stem 8 which latter is longitudinally slotted as indicated at 15, the stem 14 being secured in the fork stem 8 by the clamping means shown and of which the following is a description. The clamping mechanism referred to comprises a bushing 16 internally threaded as represented at 17 and adapted to screw upon the upper threaded end 9 of the fork stem 8 preferably to a position at which it bears down on the washer 11. The outer circumferential surface of the bushing 16 is unthreaded as represented, and the bushing is formed at its lower end with a head 18 presenting the shoulder surface 19, the portion of the bushing above the head 18 being slotted lengthwise thereof as represented at 20, these slots being shown as four in number, though the number thereof may be varied as desired. Surrounding the upper end of the bushing 16 is a clamping sleeve represented at 21, this sleeve being of the split type as shown and formed with a pinch-bolt 22 engaging the outwardly turned ends 23 of the sleeve and operating to contract the sleeve about the upper slitted end of the bushing 16, the upper edge of the sleeve 21 being preferably inwardly turned as represented at 24 to extend over the top of the bushing and the fork stem as represented in Fig. 1.

It will be understood from the foregoing that upon tightening the bolt 22 in the sleeve 21, the bushing 16 will be contracted about the upper end of the fork stem 8 with the result of contracting the latter into rigid clamping engagement with the lower end of the handle-bar stem thereby securely clamping the latter and the fork stem together to resist relative turning thereof. It will be noted that by the arrangement shown, the cutting away of the upper threads of the portion 9, is avoided, and thereby the full strength of the upper end of the tube is retained and the danger of the fork stem breaking at this part thereof, is reduced to the minimum.

The bushing 16 in the particular construction shown also serves as a lock-nut for the cone 10 of the bearing. The construction illustrated in Fig. 4 is the same as that of the preceding figures except that the outer upper surface of the bushing 16 instead of being unthreaded, is provided with a thread 25 which tapers upwardly, and instead of providing a clamping sleeve of the split type as shown in the preceding figures, a nut 26 in the form of a sleeve and having a tapering thread 27 to engage with the tapering thread 25 is provided, the sleeve 26 in being screwed down upon the bushing 16 operating, by reason of the tapered threads referred to, to contract the bushing about the upper end of the fork stem 8 and in turn contract the latter about the handle-bar stem 14 and thus bind these parts firmly together.

It will be understood that if desired the handle-bar stem may be slit at its lower end and provided with an internal expander device, such as that commonly used, to supplement the clamping means described.

While I have illustrated and described certain forms in which my invention may be embodied, I do not wish to be understood as intending to limit it thereto as the same may be variously modified and altered without departing from the spirit of my invention.

What I claim as new and desire to secure by Letters Patent is:

1. In cycle construction the combination of a front-fork member externally threaded at the upper hollow end of its stem and slit to adapt it to be contracted, a handle-bar stem located in the upper end of said fork stem, a slitted bushing screwed upon the upper end of said fork stem, a split-clamping sleeve surrounding said bushing, and means engaging said sleeve for contracting the latter about said fork stem and said fork stem about said handle-bar stem.

2. In cycle construction the combination of a front-fork member externally threaded at the upper hollow end of its stem and slit to adapt it to be contracted, a handle-bar stem located in the upper end of said fork stem, a slitted bushing screwed upon the upper end of said fork stem, a portion of the outer surface of said bushing being unthreaded, a split clamping sleeve surrounding said unthreaded portion of said bushing and means for contracting the latter about said fork stem and said fork stem about said handle-bar stem.

3. In cycle construction the combination of a front-fork member externally threaded at the upper hollow end of its stem and slit to adapt it to be contracted, a handle-bar stem located in the upper end of said fork stem, a slitted bushing screwed upon the upper end of said fork stem, a portion of the outer surface of said bushing being unthreaded, and a split clamping sleeve provided with a pinch-bolt surrounding said unthreaded portion of said bushing and operating to contract the latter about said fork stem and said fork stem about said handle-bar stem.

4. In cycle construction the combination of a front-fork member externally threaded at the upper hollow end of its stem and slit to adapt it to be contracted, a handle-bar stem located in the upper end of said fork stem, a tubular member surrounding said fork stem, bearings for journalling said fork stem in said tubular member, the upper one of said bearings being threaded on said fork-stem, a slitted bushing screwed upon the upper end of said fork stem and operating as a lock-nut for said bearing, and means engaging said upper bushing for contracting the latter about said fork stem and said fork stem about said handle-bar stem.

AUGUST D. MEISELBACH.